United States Patent [19]
Schuster

[11] Patent Number: 6,040,644
[45] Date of Patent: Mar. 21, 2000

[54] SHAFT FOR A MOTOR-DRIVEN SPINDLE

[75] Inventor: Johann Schuster, Nuremberg, Germany

[73] Assignee: Paul Müller GmbH & Co. KG, Nuremberg, Germany

[21] Appl. No.: 09/100,836

[22] Filed: Jun. 19, 1998

[30] Foreign Application Priority Data

Jun. 20, 1997 [DE] Germany ........................... 197 26 341

[51] Int. Cl.⁷ ................................................. H02K 21/14
[52] U.S. Cl. ............................. 310/43; 310/156; 310/261
[58] Field of Search ................................. 310/42, 43, 45, 310/156, 261, 262

[56] References Cited

U.S. PATENT DOCUMENTS

| | | | |
|---|---|---|---|
| 4,706,364 | 11/1987 | Aubry | 29/458 |
| 5,473,211 | 12/1995 | Arkkio | 310/166 |
| 5,684,352 | 11/1997 | Mita et al. | 310/156 |
| 5,903,078 | 5/1999 | Sakamoto et al. | 310/90.5 |

FOREIGN PATENT DOCUMENTS 19543541  11/1996  Germany ........................... H02K 5/16

*Primary Examiner*—Nestor Ramirez
*Assistant Examiner*—Judson H. Jones
*Attorney, Agent, or Firm*—Steinberg & Raskin, P.C.

[57] ABSTRACT

A shaft for a motor-driven spindle including an elongate section made of a reinforced plastic material and a rotor arranged around the elongate section and surrounded by reinforced plastic material. The rotor may be wound by the reinforced plastic material and if it includes grooves on an outer circumference, the reinforced plastic material is wound into the grooves. A faceted wheel may be provided on the shaft and include reflective surfaces on an outer circumference thereof. The shaft is arranged in a housing of the motor-driven spindle.

10 Claims, 1 Drawing Sheet ly accomplished:

SHAFT FOR A MOTOR-DRIVEN SPINDLE

FIELD OF THE INVENTION

The present invention relates to a shaft for a motor-driven spindle and a motor-driven spindle including the same.

BACKGROUND OF THE INVENTION

Motor-driven spindles find many applications in industry and technology. They basically consists of a shaft mounted in a housing. The shaft is driven in many cases by electrical motors. The shaft is supported in the sleeve generally by means of roller bearings or air bearings.

Known spindles have one particular disadvantage in that there are speed limitations due to the centrifugal forces arising during operation, in particular at higher rotational speeds. These centrifugal forces affect the running precision of the shaft and may adversely affect the attachment of a rotor mounted on the shaft. As a result, the generation of the centrifugal forces determines capacity limits for conventional spindles.

OBJECTS AND SUMMARY OF THE INVENTION

It is an object of the present invention to provide new and improved shafts for motor-driven spindles.

It is another object of the present invention to provide shafts for motor-driven spindles in which the disadvantages of the conventional prior art motor-driven spindles are substantially avoided.

It is yet another object of the present invention to provide motor-driven spindles which are capable of rotating at high rotational speeds.

In order to achieve these objects and others, a shaft for a motor-driven spindle in accordance with the invention includes an elongate section made of a reinforced plastic material and a rotor arranged around a part of the elongate section and incorporated into the reinforced plastic material. The rotor may be wound with the reinforced plastic material and if it includes grooves on an outer circumference, the reinforced plastic material may be wound into the grooves. The reinforced plastic material may be a carbon fiber laminate.

A motor-driven spindle in accordance with the invention includes a housing, a shaft arranged in the housing and made of reinforced plastic material, the shaft having an elongate section, and power means for rotating the shaft. The power means comprise a stator and a rotor which is arranged around a part of the elongate section of the shaft and incorporated into the material of the shaft. The shaft may include a faceted wheel having a plurality of reflective surfaces on an outer circumference thereof. The housing therefore includes an optical window for allowing penetration of laser rays into contact with the reflective surfaces on the faceted wheel.

In a method for making a shaft for a motor-driven spindle in accordance with the invention, carbon fibers are wound into the form of a shaft, the carbon fibers are embedded in plastic material, a circular rotor is arranged around a part of the shaft, and reinforced plastic material is wound around the rotor to incorporate the rotor into connection with the shaft, i.e., embed the rotor within the material of the shaft to thereby form a unitary structure.

BRIEF DESCRIPTION OF THE DRAWING

A more complete appreciation of the present invention and many of the attendant advantages thereof will be readily understood by reference to the following detailed description when considered in connection with the accompanying drawing in which.

DETAILED DESCRIPTION OF THE PREFERRED EMBODIMENTS

Figure 1:
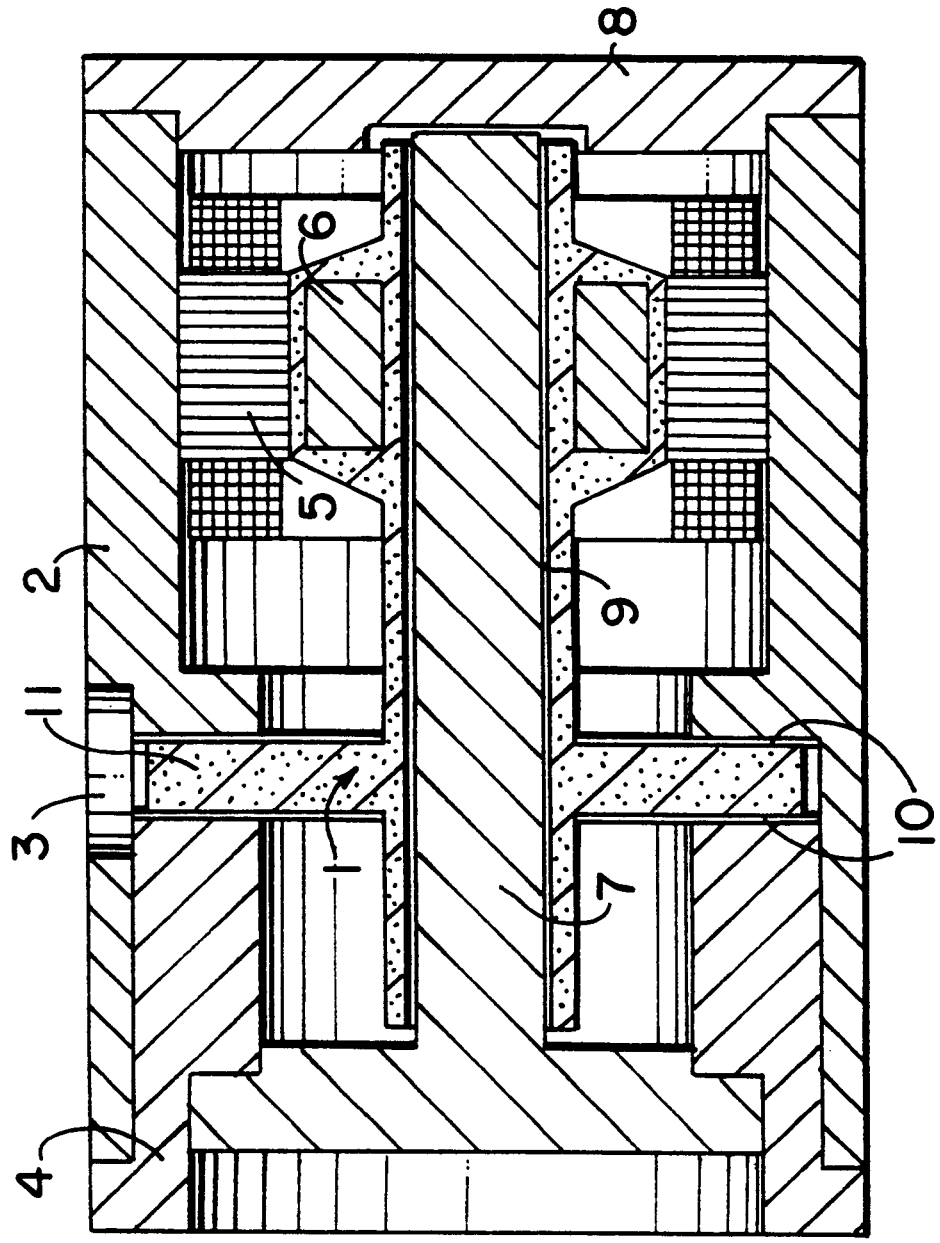
FIG. 1 is a cross-sectional view of a shaft for a motor-drive spindle in accordance with the invention.

Referring to the accompanying drawing, a preferred embodiment of a motor-driven spindle including a shaft according to the invention is shown. The motor-driven spindle includes a housing 2 and a shaft 1 arranged in the housing 2. Shaft 1 has an elongate, tubular section and a faceted wheel 11 with twenty-five (25) reflective, mirror surfaces on the circumference arranged at a location along the length of the elongate portion. Shaft 1 is made of composite material or carbon fiber laminate.

The housing 2 also defines at least one optical window 3 in an outer surface thereof for allowing the entry and exit of laser rays and is positioned to allow the laser rays to reflect against the surfaces on the faceted wheel 11. A guide bushing 4 is arranged in the housing 2. Power means for driving the shaft 1 are provided in the housing 2 and comprise a stator 5 and a rotor or permanent magnet 6. An axle 7 extends through the shaft 1. A closing lid 8 is arranged at a side of the housing 1 alongside the stator 5 and rotor 6. A bearing gap or radial air gap 9 (aerodynamic radial bearing) is defined between the shaft 1 and the axle 7 by appropriate dimensioning and placement of the shaft 1 and axle 7. A bearing gap or axial bearing 10 (aerodynamic axial bearing) is defined between the faceted wheel 11, adjacent surfaces of the guide bushing 4 and adjacent surfaces of the housing 2 by appropriate dimensioning and placement of the shaft 1, the guide bushing 4 and the housing 2.

The shaft 1 rotates on the radial air gap 9 around the axle 7. The lateral surfaces of the faceted wheel 11 are used to define the axial bearing 10. The faceted wheel 11 comprises 25 surfaces on the circumference (similar to key surfaces). These surfaces are made into mirrors and serve to deflect a laser ray contacting the surfaces through optical window 3. Each facete is used to illuminate an image cell.

Stator 5 and rotor 6 together make up a direct-current motor which is commutated via hall-effect IC's.

In accordance with the invention, the shaft 1 and the rotor 6 constitute a solid unit. The shaft 1 is made of carbon fiber laminate material, whereby the carbon fibers are wound into the form of the shaft and are imbedded in plastic. Thus, reinforced plastic materials are known. The rotor 6 is placed around a part of the shaft 1 and then is surrounded by the basic shaft material (carbon fiber laminate) to thereby form a projecting portion of the shaft 1, i.e., it projects beyond the cylindrical envelope defined by the elongate section of the shaft 1. More particularly, the fibers of the basic material are wound around the soft magnet (rotor 6) under tension. The arming by this fiber bandage makes it possible to obtain circumferential speeds of about 150 m/sec on the outside diameter of the magnets, with a ring width greater than about 2 mm.

This bandage makes it possible to use larger magnets and thereby motors with greater capacities than is possible with steel arming.

The faceted wheel 11 is wound in surrounding fibers and is alternately soaked with bonding material (e.g., synthetic resin) until the final diameter is reached.

According to the invention the following task is accomplished:

The shaft 1 has a speed of about 150,000 l/min, supported by a dynamic air bearing. The shaft should have a maximum of precision at about 150,000 l/min. The repeatable axle wobble is less than three (3) angular seconds, the non-repeatable less than one (1) angular second.

The following advantages are obtained over a conventional steel design:

Owing to the low weight and the great solidity of carbon fiber laminate materials, the shaft is able to attain twice the speed for the same dimensions (i.e., the same static base load).

The influence of the centrifugal force is low, and therefore the air gap is constant and the required rigidity is ensured (and with it again the running precision).

Owing to the low weight and the high degree of solidity of the carbon fiber laminate materials, the flexibility in configuration and its characteristic of being non-magnetizable, the rotor 5 which is soft by comparison for highest speeds (the rotor of the DC motor or asynchronous motor) can be easily used. Thus, this rotor cannot be deformed through centrifugal force.

The running precision is maintained.

In view of the fact that carbon fiber laminate materials cannot be magnetized, the rotor armature made of this material has no eddy current losses.

Due to its composition, it is possible to use the carbon fiber laminate material with excellent results together with steel and ceramic in dynamic air bearings.

The gliding characteristics of this material are outstanding.

Obviously, numerous modifications and variations of the present invention are possible in light of the teachings hereof Therefore, it is to be understood that the invention can be varied from the detailed description above within the scope of the claims appended hereto.

I claim:

1. A shaft for a motor-driven spindle, comprising:
   an elongate section made of a reinforced plastic material,
   a rotor arranged around said elongate section and surrounded by reinforced plastic material, and
   a faceted wheel surrounding said elongate section and including a plurality of reflective surfaces on an outer circumference thereof, said faceted wheel being incorporated into the reinforced plastic material.

2. The shaft of claim 1, wherein said rotor is wound by the reinforced plastic material.

3. The shaft of claim 1, wherein said rotor includes grooves on an outer circumference, the reinforced plastic material being wound in said grooves.

4. The shaft of claim 1, wherein said reinforced plastic material is a carbon fiber laminate.

5. A motor-driven spindle, comprising:
   a housing,
   a shaft arranged in said housing and made of reinforced plastic material said shaft having an elongate section,
   an axle arranged in shaft, and
   power means for rotating said shaft, said power means comprising a stator and a rotor, said rotor surrounding a part of said elongate section of said rotor and being surrounded by reinforced plastic.

6. The spindle of claim 5, wherein said rotor is wound by the reinforced plastic material.

7. The spindle of claim 5, wherein said rotor includes grooves on an outer circumference, the reinforced plastic material being wound into said grooves.

8. The spindle of claim 5, wherein said reinforced plastic material is a carbon fiber laminate.

9. The spindle of claim 5, wherein said shaft further includes a faceted wheel, said faceted wheel including a plurality of reflective surfaces on an outer circumference thereof, said faceted wheel being incorporated into the reinforced plastic material.

10. The spindle of claim 9, wherein said housing comprises an optical window for allowing penetration of laser rays into contact with said reflective surfaces on said faceted wheel.

* * * * *